US009484961B2

United States Patent
Lum et al.

(10) Patent No.: US 9,484,961 B2
(45) Date of Patent: Nov. 1, 2016

(54) WIRELESS ELECTRONIC DEVICE WITH ANTENNA SWITCHING CIRCUITRY

(71) Applicant: Apple Inc., Cupertino, CA (US)

(72) Inventors: Nicholas W. Lum, Santa Clara, CA (US); Ronald W. Dimpflmaier, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/631,483

(22) Filed: Sep. 28, 2012

(65) Prior Publication Data
US 2013/0148636 A1 Jun. 13, 2013

Related U.S. Application Data (60) Provisional application No. 61/569,641, filed on Dec. 12, 2011.

(51) Int. Cl.
*H04B 1/00* (2006.01)
*H04B 7/04* (2006.01)
*H01Q 1/24* (2006.01)

(52) U.S. Cl.
CPC .......... *H04B 1/0064* (2013.01); *H04B 1/0067* (2013.01); *H01Q 1/241* (2013.01); *H04B 1/0053* (2013.01); *H04B 7/0404* (2013.01)

(58) Field of Classification Search
USPC ....... 370/278, 282, 297, 336, 338, 334, 339, 370/343; 455/73, 75, 78, 82, 83, 272, 455/276.1, 277.1, 277.2, 280, 289, 552.1, 455/553.1, 575.7, 63.1; 343/702, 853, 876, 343/904
See application file for complete search history.

(56) References Cited

U.S. PATENT DOCUMENTS 6,392,610 B1   5/2002  Braun et al.
6,496,158 B1 * 12/2002  Ksienski .................. H01Q 3/36
                                                             342/374

(Continued)

FOREIGN PATENT DOCUMENTS

CN         1954460      4/2007
CN       201199687      2/2009

(Continued)

OTHER PUBLICATIONS

"3rd Generation Partnership Project; Technical Specification Group Radio Access Networks; Evolved Universal Terrestrial Radio Access (E-ULTRA); Study on signalling and procedure for interference avoidance for in-device coexistance; (Release 10)", 3GPP Standard; 3GPP TR 36.816, 3rd Generation Partnership Project (3GPP), Mobile Competence Centre; 650, Route Des Lucioles; F-06921 Sophia-Antipolis Cedex; France, Dec. 17, 2010 (pp. 1-34), XP050462125.

*Primary Examiner* — Edan Orgad
*Assistant Examiner* — Saumit Shah
(74) *Attorney, Agent, or Firm* — Treyz Law Group, P.C.; Michael H. Lyons (57) ABSTRACT

A wireless electronic device may include antennas formed at different locations on the device. The wireless electronic device may include transceivers that are used to wirelessly communicate in different frequency bands by transmitting and receiving radio-frequency signals in the frequency bands. The transceivers may include Wi-Fi® transceivers and cellular transceivers such as Long Term Evolution transceivers. The wireless electronic device may include antenna switching circuitry interposed between the transceivers and the antennas. The wireless electronic device may include control circuitry that controls the antenna switching circuitry to ensure that radio-frequency transmissions in adjacent frequency bands are routed to different antennas. By routing radio-frequency transmissions in adjacent frequency bands to different antennas, self-interference between communications in the adjacent frequency bands may be reduced. Self-interference may also be reduced by performing time division multiplexing to isolate radio-frequency signals that are transmitted in adjacent frequency bands.

22 Claims, 7 Drawing Sheets

(56) References Cited

U.S. PATENT DOCUMENTS

| | | |
|---|---|---|
| 7,109,924 B2 | 9/2006 | Vance |
| 2005/0020299 A1* | 1/2005 | Malone et al. ............ 455/552.1 |
| 2005/0057426 A1 | 3/2005 | Itkin |
| 2005/0245202 A1 | 11/2005 | Ranta et al. |
| 2005/0259011 A1* | 11/2005 | Vance ........................... 343/702 |
| 2005/0277387 A1 | 12/2005 | Kojima et al. |
| 2006/0025171 A1 | 2/2006 | Ly et al. |
| 2006/0292986 A1 | 12/2006 | Bitran et al. |
| 2007/0093270 A1 | 4/2007 | Lagnado |
| 2008/0192806 A1 | 8/2008 | Wyper et al. |
| 2009/0256757 A1* | 10/2009 | Chiang et al. ............... 343/702 |
| 2009/0262042 A1 | 10/2009 | Li et al. |
| 2010/0120466 A1 | 5/2010 | Li |
| 2010/0157858 A1 | 6/2010 | Lee et al. |
| 2011/0009074 A1 | 1/2011 | Hsu et al. |
| 2011/0014879 A1 | 1/2011 | Alberth et al. |
| 2011/0045881 A1 | 2/2011 | Lo et al. |
| 2011/0116490 A1 | 5/2011 | Wilhelmsson et al. |
| 2011/0210901 A1 | 9/2011 | Tikka et al. |
| 2011/0250926 A1* | 10/2011 | Wietfeldt et al. ............. 455/525 |
| 2012/0046003 A1* | 2/2012 | Ying ....................... H04B 1/406 455/90.2 |
| 2012/0164948 A1* | 6/2012 | Narasimha et al. ......... 455/63.1 |
| 2014/0031036 A1* | 1/2014 | Koo ....................... H04W 36/14 455/434 |

FOREIGN PATENT DOCUMENTS

| | | |
|---|---|---|
| CN | 101924580 | 12/2010 |
| CN | 101997562 | 3/2011 |
| CN | 102273011 | 12/2011 |
| CN | 203071979 | 7/2013 |
| EP | 1681772 | 7/2006 |
| EP | 1976131 | 10/2008 |
| JP | 2004254098 A | 9/2004 |
| JP | 2007124647 A | 5/2007 |
| KR | 10/2011-0091760 | 8/2011 |
| WO | 20100055201 | 5/2010 |
| WO | 2010089281 | 8/2010 |
| WO | 2011084715 | 7/2011 |
| WO | 2012009172 | 1/2012 |
| WO | 2012061765 | 5/2012 |
| WO | 2012145206 | 10/2012 |

* cited by examiner

FIG. 7

WIRELESS ELECTRONIC DEVICE WITH ANTENNA SWITCHING CIRCUITRY

This application claims priority to U.S. provisional patent application No. 61/569,641 filed Dec. 12, 2011, which is hereby incorporated by reference herein in its entirety.

BACKGROUND

This invention relates generally to electronic devices, and more particularly, to wireless electronic devices that wirelessly communicate in multiple frequency bands.

Electronic devices such as handheld electronic devices and other portable electronic devices are becoming increasingly popular. Examples of handheld devices include cellular telephones, handheld computers, media players, and hybrid devices that include the functionality of multiple devices of this type. Popular portable electronic devices that are somewhat larger than traditional handheld electronic devices include laptop computers and tablet computers.

Due in part to their mobile nature, portable electronic devices are often provided with wireless communications capabilities. For example, portable electronic devices may use long-range wireless communications to communicate with wireless base stations and may use short-range wireless communications links such as links for supporting the Wi-Fi® (IEEE 802.11) bands at 2.4 GHz and 5.0 GHz and the Bluetooth® band at 2.4 GHz.

Wireless electronic devices are often used for simultaneous communications using different technologies. For example, wireless electronic devices may be used to transmit data to a cellular network and to a Wi-Fi® network simultaneously. It may be challenging to design wireless electronic devices to accommodate simultaneous communications using different technologies. For example, filters with high isolation may be required to isolate cellular transceiver circuitry from WiFi® transceiver circuitry when the cellular and WiFi® transceiver circuitry transmit radio-frequency signals using the same antenna.

It would therefore be desirable to be able to provide electronic devices with improved wireless communications capabilities.

SUMMARY

A wireless electronic device may include antennas formed at different locations on the device. For example, the antennas may be formed at opposite ends of the device. The wireless electronic device may include transceivers that are used to wirelessly communicate in different frequency bands by transmitting and receiving radio-frequency signals in the frequency bands. The transceivers may include WiFi® transceivers and cellular transceivers such as Long Term Evolution (LTE) transceivers. The wireless electronic device may include antenna switching circuitry interposed between the transceivers and the antennas. The wireless electronic device may include control circuitry such as storage and processing circuitry and baseband circuitry that controls the antenna switching circuitry to ensure that radio-frequency transmissions in adjacent frequency bands are routed to different antennas. By routing radio-frequency transmissions in adjacent frequency bands to different antennas, interference between communications in the adjacent frequency bands may be reduced.

The wireless electronic device may be assigned a cellular frequency band by a base station. The wireless electronic device may perform antenna transmit diversity operations to determine which antenna is to be used for cellular communications in the assigned cellular frequency band. The wireless electronic device may identify whether the assigned cellular frequency band is adjacent to WiFi® frequency bands that are used by the device. In response to identifying that the assigned cellular frequency band is adjacent to the WiFi® frequency bands, the wireless electronic device may configure the antenna switching circuitry to route WiFi® communications to and from an antenna different from the antenna used for cellular communications.

The wireless electronic device may reduce interference between communications in adjacent frequency bands by partitioning wireless communications in time (e.g., by performing time division multiplexing). Radio-frequency signals in a first frequency band may be transmitted during time periods that alternate with time periods assigned to a second frequency band that is adjacent to the first frequency band.

Further features of the present invention, its nature and various advantages will be more apparent from the accompanying drawings and the following detailed description.

DETAILED DESCRIPTION

The present invention relates generally to wireless communications, and more particularly, to wireless electronic devices that perform antenna switching to ensure that radio-frequency signals in adjacent frequency bands are routed to different antennas.

The wireless electronic devices may be portable electronic devices such as laptop computers or small portable computers of the type that are sometimes referred to as ultraportables. Portable electronic devices may include tablet computing devices (e.g., a portable computer that includes a touch-screen display). Portable electronic devices may also be somewhat smaller devices. Examples of smaller portable electronic devices include wrist-watch devices, pendant devices, headphone and earpiece devices, and other wearable and miniature devices. With one suitable arrangement, the portable electronic devices may be handheld electronic devices.

The wireless electronic devices may be, for example, cellular telephones, media players with wireless communications capabilities, handheld computers (also sometimes called personal digital assistants), remote controllers, global positioning system (GPS) devices, tablet computers, and handheld gaming devices. The wireless electronic devices may also be hybrid devices that combine the functionality of multiple conventional devices. Examples of hybrid portable electronic devices include a cellular telephone that includes media player functionality, a gaming device that includes a wireless communications capability, a cellular telephone that includes game and email functions, and a portable device that receives email, supports mobile telephone calls, has music player functionality and supports web browsing. These are merely illustrative examples.

Figure 1:
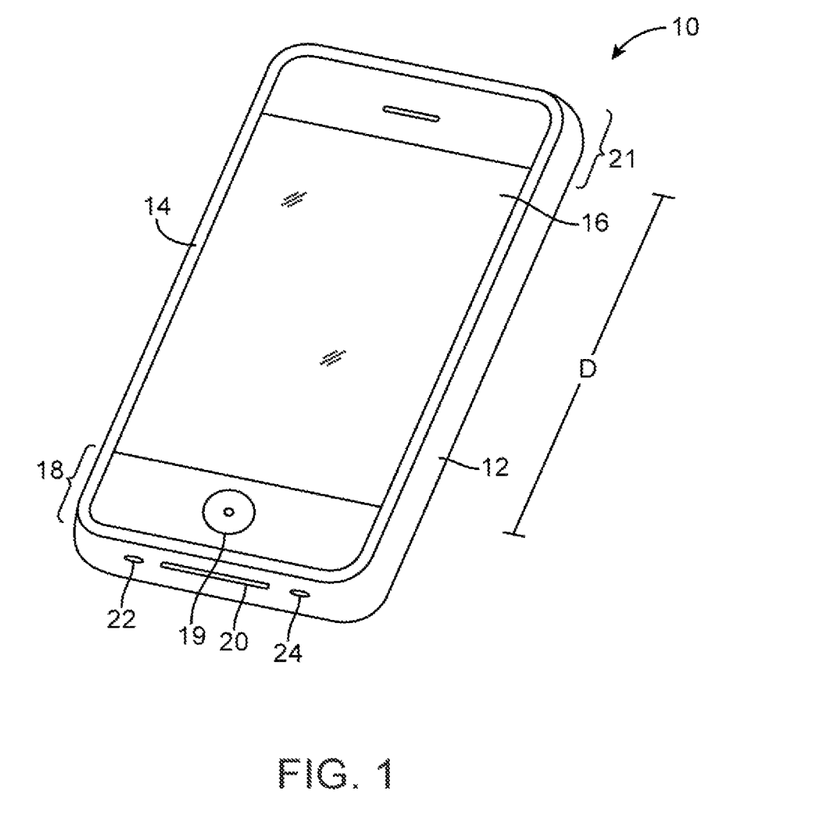
FIG. 1 is a perspective view of an illustrative electronic device with antenna switching capabilities in accordance with an embodiment of the present invention.

An illustrative wireless electronic device in accordance with an embodiment of the present invention is shown in FIG. 1. Device 10 of FIG. 1 may be, for example, a portable electronic device.

Device 10 may have housing 12. Antennas for handling wireless communications may be housed within housing 12 (as an example).

Housing 12, which is sometimes referred to as a case, may be formed of any suitable materials including, plastic, glass, ceramics, metal, or other suitable materials, or a combination of these materials. In some situations, housing 12 or portions of housing 12 may be formed from a dielectric or other low-conductivity material, so that the operation of conductive antenna elements that are located in proximity to housing 12 is not disrupted. Housing 12 or portions of housing 12 may also be formed from conductive materials such as metal. An illustrative housing material that may be used is anodized aluminum. Aluminum is relatively light in weight and, when anodized, has an attractive insulating and scratch-resistant surface. If desired, other metals can be used for the housing of device 10, such as stainless steel, magnesium, titanium, alloys of these metals and other metals, etc. In scenarios in which housing 12 is formed from metal elements, one or more of the metal elements may be used as part of the antennas in device 10. For example, metal portions of housing 12 may be shorted to an internal ground plane in device 10 to create a larger ground plane element for that device 10. To facilitate electrical contact between an anodized aluminum housing and other metal components in device 10, portions of the anodized surface layer of the anodized aluminum housing may be selectively removed during the manufacturing process (e.g., by laser etching).

Housing 12 may have a bezel 14. The bezel 14 may be formed from a conductive material and may serve to hold a display or other device with a planar surface in place on device 10. As shown in FIG. 1, for example, bezel 14 may be used to hold display 16 in place by attaching display 16 to housing 12.

Display 16 may be a liquid crystal diode (LCD) display, an organic light emitting diode (OLED) display, or any other suitable display. The outermost surface of display 16 may be formed from one or more plastic or glass layers. If desired, touch screen functionality may be integrated into display 16 or may be provided using a separate touch pad device. An advantage of integrating a touch screen into display 16 to make display 16 touch sensitive is that this type of arrangement can save space and reduce visual clutter.

Display screen 16 (e.g., a touch screen) is merely one example of an input-output device that may be used with electronic device 10. If desired, electronic device 10 may have other input-output devices. For example, electronic device 10 may have user input control devices such as button 19, and input-output components such as port 20 and one or more input-output jacks (e.g., for audio and/or video). Button 19 may be, for example, a menu button. Port 20 may contain a 30-pin data connector (as an example). Openings 24 and 22 may, if desired, form microphone and speaker ports. In the example of FIG. 1, display screen 16 is shown as being mounted on the front face of portable electronic device 10, but display screen 16 may, if desired, be mounted on the rear face of portable electronic device 10, on a side of device 10, on a flip-up portion of device 10 that is attached to a main body portion of device 10 by a hinge (for example), or using any other suitable mounting arrangement.

A user of electronic device 10 may supply input commands using user input interface devices such as button 19 and touch screen 16. Suitable user input interface devices for electronic device 10 include buttons (e.g., alphanumeric keys, power on-off, power-on, power-off, and other specialized buttons, etc.), a touch pad, pointing stick, or other cursor control device, a microphone for supplying voice commands, or any other suitable interface for controlling device 10. Although shown schematically as being formed on the top face of electronic device 10 in the example of FIG. 1, buttons such as button 19 and other user input interface devices may generally be formed on any suitable portion of electronic device 10. For example, a button such as button 19 or other user interface control may be formed on the side of electronic device 10. Buttons and other user interface controls can also be located on the top face, rear face, or other portion of device 10. If desired, device 10 can be controlled remotely (e.g., using an infrared remote control, a radio-frequency remote control such as a Bluetooth remote control, etc.).

Electronic device 10 may have ports such as port 20. Port 20, which may sometimes be referred to as a dock connector, 30-pin data port connector, input-output port, or bus connector, may be used as an input-output port (e.g., when connecting device 10 to a mating dock connected to a computer or other electronic device). Device 10 may also have audio and video jacks that allow device 10 to interface with external components. Typical ports include power jacks to recharge a battery within device 10 or to operate device 10 from a direct current (DC) power supply, data ports to exchange data with external components such as a personal computer or peripheral, audio-visual jacks to drive headphones, a monitor, or other external audio-video equipment, a subscriber identity module (SIM) card port to authorize cellular telephone service, a memory card slot, etc. The functions of some or all of these devices and the internal circuitry of electronic device 10 can be controlled using input interface devices such as touch screen display 16.

Components such as display 16 and other user input interface devices may cover most of the available surface area on the front face of device 10 (as shown in the example of FIG. 1) or may occupy only a small portion of the front face of device 10. Because electronic components such as display 16 often contain large amounts of metal (e.g., as radio-frequency shielding), the location of these components relative to the antenna elements in device 10 should generally be taken into consideration. Suitably chosen locations for the antenna elements and electronic components of the device will allow the antennas of electronic device 10 to function properly without being disrupted by the electronic components.

Examples of locations in which antenna structures may be located in device 10 include region 18 (e.g., a first antenna) and region 21 (e.g., a second antenna). Region 18 may be separated from region 21 by a distance D. These are merely illustrative examples. Any suitable portion of device 10 may be used to house antenna structures for device 10 if desired.

Figure 2:
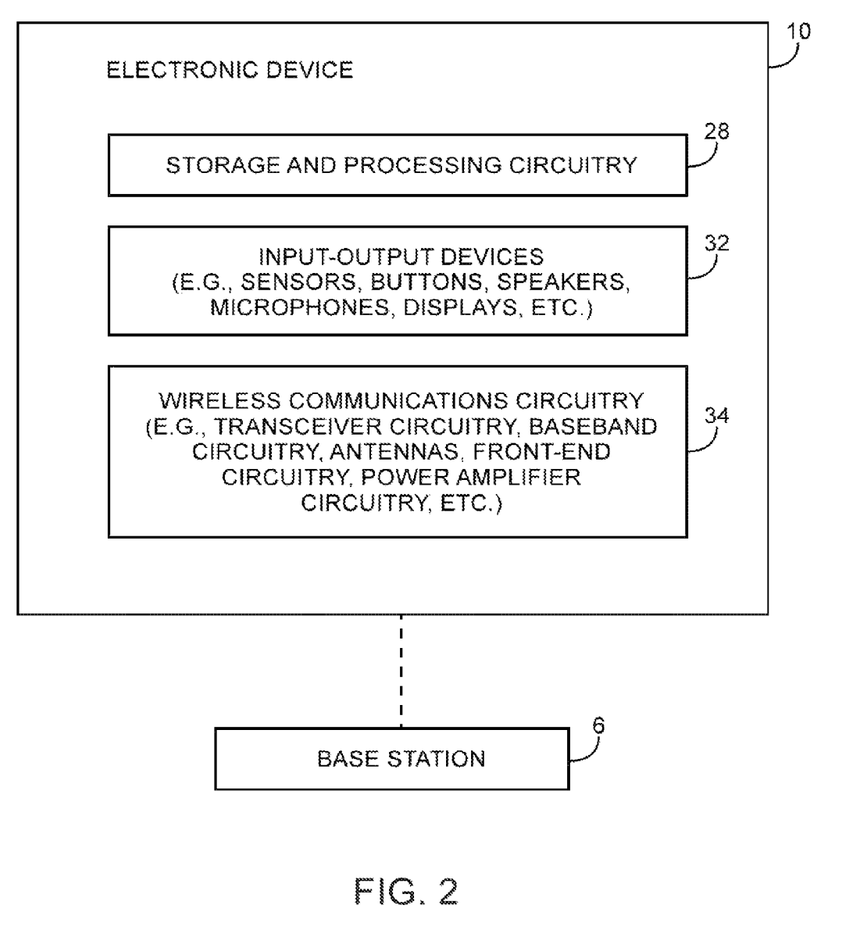
FIG. 2 is a schematic diagram of an illustrative electronic device with wireless communications circuitry in accordance with an embodiment of the present invention.

Wireless electronic devices such as device 10 of FIG. 2 may be provided with wireless communications circuitry. The wireless communications circuitry may be used to support long-range wireless communications such as communications in cellular telephone frequency bands (e.g., ranges of frequencies associated with wireless standards or protocols). Examples of long-range (cellular telephone) bands that may be handled by device 10 include the 800 MHz band, the 850 MHz band, the 900 MHz band, the 1800 MHz band, the 1900 MHz band, the 2100 MHz band, the 700 MHz band, the 2500 MHz band, and other frequency bands. Each long-range band may be associated with a range of frequencies. For example, the 850 MHz band may be associated with frequency range 824-849 MHz and the 2500 MHz band may be associated with frequency range 2500-2570 MHz. Examples of wireless standards or protocols that are associated with the cellular telephone frequency bands include Global System for Mobile (GSM) communications standard, the Universal Mobile Telecommunications System (UMTS) standard, and standards that use technologies such as Code Division Multiple Access, time division multiplexing, frequency division multiplexing, etc. The long-range bands used by device 10 may include the so-called LTE (Long Term Evolution) bands. The LTE bands are numbered (e.g., 1, 2, 3, etc.) and are sometimes referred to as E-UTRA operating bands. As an example, LTE band 7 corresponds to uplink frequencies between 2.5 GHz and 2.57 GHz (e.g., frequencies used to transmit wireless signals to a base station) and downlink frequencies between 2.62 GHz and 2.69 (e.g., frequencies used to receive wireless signals from a base station).

Long-range signals such as signals associated with satellite navigation bands may be received by the wireless communications circuitry of device 10. For example, device 10 may use wireless circuitry to receive signals in the 1575 MHz band associated with Global Positioning System (GPS) communications. Short-range wireless communications may also be supported by the wireless circuitry of device 10. For example, device 10 may include wireless circuitry for handling local area network links such as WiFi® links at 2.4 GHz and 5 GHz, Bluetooth links and Bluetooth Low Energy links at 2.4 GHz, etc.

As shown in FIG. 2, device 10 may include storage and processing circuitry 28. Storage and processing circuitry 28 may include storage such as hard disk drive storage, non-volatile memory (e.g., flash memory or other electrically-programmable-read-only memory configured to form a solid state drive), volatile memory (e.g., static or dynamic random-access-memory), etc. Processing circuitry in storage and processing circuitry 28 may be used to control the operation of device 10. This processing circuitry may be based on one or more microprocessors, microcontrollers, digital signal processors, application specific integrated circuits, etc.

Storage and processing circuitry 28 may be used to run software on device 10, such as internet browsing applications, voice-over-internet-protocol (VOIP) telephone call applications, email applications, media playback applications, operating system functions, functions related to radio-frequency transmission and reception such as selection of communications frequencies, etc. To support interactions with external equipment, storage and processing circuitry 28 may be used in implementing communications protocols. Communications protocols that may be implemented using storage and processing circuitry 28 include internet protocols, wireless local area network protocols (e.g., IEEE 802.11 protocols—sometimes referred to as Wi-Fi®), protocols for other short-range wireless communications links such as the Bluetooth protocol, cellular telephone protocols, MIMO (multiple input multiple output) protocols, antenna diversity protocols, etc. Wireless communications operations such as communications frequency selection operations may be controlled using software stored and running on device 10 (e.g., stored and running on storage and processing circuitry 28).

Electronic device 10 may include wireless communications circuitry 34 for communicating wirelessly with external equipment. Therefore, electronic device 10 may sometimes be referred to as a wireless device or a wireless electronic device. Wireless communications circuitry 34 may include radio-frequency (RF) transceiver circuitry formed from one or more integrated circuits, baseband circuitry, power amplifier circuitry, low-noise input amplifiers, passive RF components, one or more antennas, transmission lines, and other circuitry such as front-end circuitry for handling RF wireless signals. Wireless signals can also be sent using light (e.g., using infrared communications).

Wireless communications circuitry 34 may include radio-frequency transceiver circuitry for handling various radio-frequency communications bands. For example, circuitry 34 may include transceiver circuitry that handles 2.4 GHz and 5 GHz bands for WiFi (IEEE 802.11) communications and/or handles the 2.4 GHz band for Bluetooth communications. Circuitry 34 may include cellular telephone transceiver circuitry for handling wireless communications in cellular telephone bands such as at 850 MHz, 900 MHz, 1800 MHz, 1900 MHz, 2100 MHz, the LTE bands, and other bands (as examples). Circuitry 34 may handle voice data and non-voice data. If desired, wireless communications circuitry 34 may include global positioning system (GPS) receiver equipment for receiving GPS signals at 1575 MHz or for handling other satellite positioning data.

Wireless communications circuitry 34 may include one or more antennas 40. Antennas 40 may be formed using any suitable antenna types. For example, antennas 40 may include antennas with resonating elements that are formed from loop antenna structures, patch antenna structures, inverted-F antenna structures, slot antenna structures, planar inverted-F antenna structures, helical antenna structures, hybrids of these designs, etc. Different types of antennas may be used for different bands and combinations of bands. For example, one type of antenna may be used in forming a local wireless link antenna and another type of antenna may be used in forming a remote wireless link antenna.

Antenna diversity schemes may be implemented in which multiple redundant antennas are used in handling communications for a particular band or bands. In an antenna diversity scheme, storage and processing circuitry 28 may select which antenna to use in real time based on signal strength measurements or other data. For example, storage and processing circuitry 28 may select which antenna to use for LTE communications with a base station. In multiple-input-multiple-output (MIMO) schemes, multiple antennas may be used to transmit and receive multiple data streams, thereby enhancing data throughput.

Figure 3:
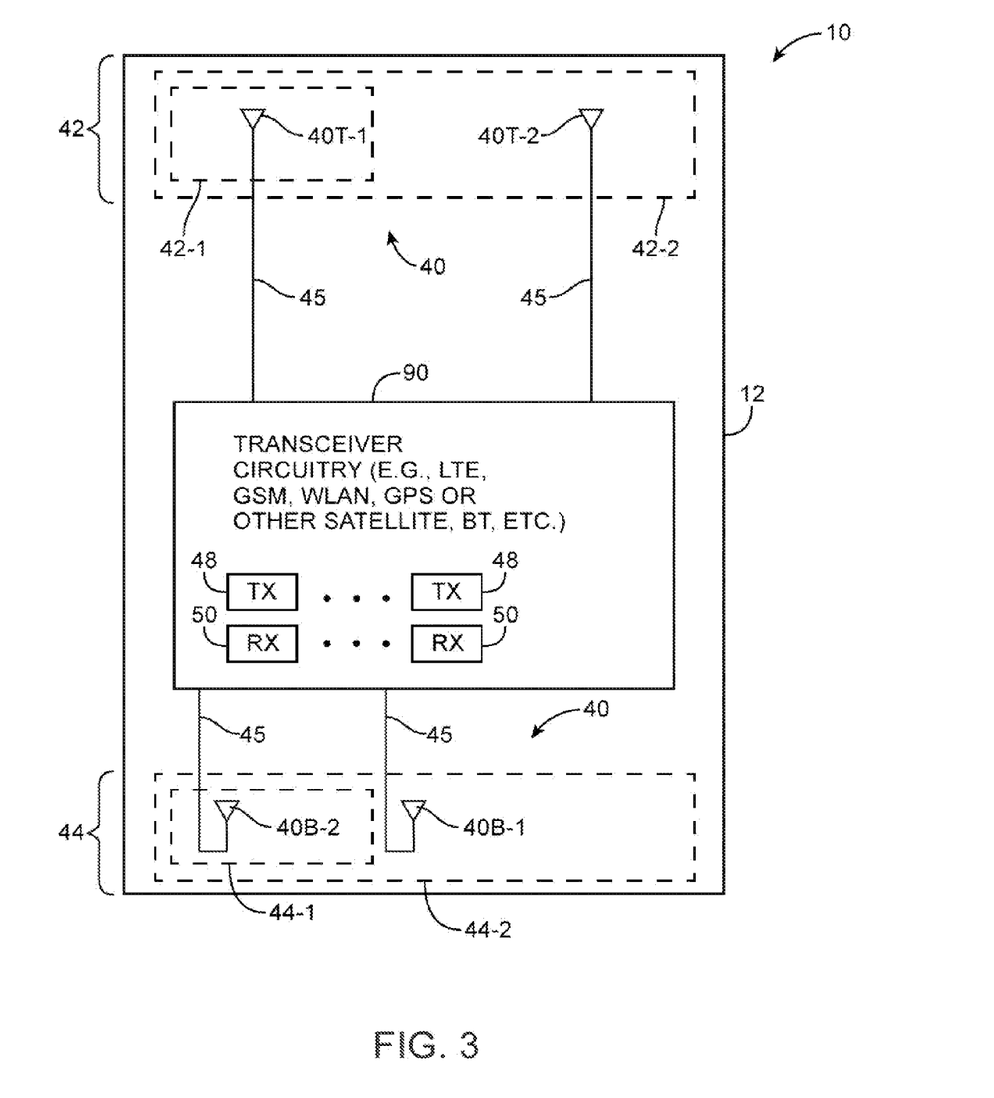
FIG. 3 is a diagram showing how radio-frequency transceiver circuitry may be coupled to one or more antennas within an electronic device in accordance with an embodiment of the present invention.

Illustrative locations in which antennas 40 may be formed in device 10 are shown in FIG. 3. As shown in FIG. 3, electronic device 10 may have a housing such as housing 12.

Housing 12 may include plastic walls, metal housing structures, structures formed from carbon-fiber materials or other composites, glass, ceramics, or other suitable materials. Housing 12 may be formed using a single piece of material (e.g., using a unibody configuration) or may be formed from a frame, housing walls, and other individual parts that are assembled to form a completed housing structure. The components of device 10 that are shown in FIG. 1 may be mounted within housing 12. Antenna structures 40 may be mounted within housing 12 and may, if desired, be formed using parts of housing 12. For example, housing 12 may include metal housing sidewalls, peripheral conductive members such as band-shaped members (with or without dielectric gaps), conductive bezels, and other conductive structures that may be used in forming antenna structures 40.

As shown in FIG. 3, antenna structures 40 may be coupled to transceiver circuitry 90 by paths such as paths 45. Paths 45 may include transmission line structures such as coaxial cables, microstrip transmission lines, stripline transmission lines, etc. Paths 45 may also include impedance matching circuitry, filter circuitry, and switching circuitry. Impedance matching circuitry may be used to ensure that antennas 40 are efficiently coupled to transceiver circuitry 90 in communications bands of interest. Filter circuitry may be used to implement frequency-based multiplexing circuits such as diplexers, duplexers, and triplexers. Switching circuitry may be used to selectively couple antennas 40 to desired ports of transceiver circuitry 90. For example, in one operating mode a switch may be configured to route one of paths 45 to a given antenna and in another operating mode the switch may be configured to route a different one of paths 45 to the given antenna. The use of switching circuitry between transceiver circuitry 90 and antennas 40 allows device 10 to support multiple communications bands of interest with a limited number of antennas.

In a device such as a cellular telephone that has an elongated rectangular outline, it may be desirable to place antennas 40 at one or both ends of the device. As shown in FIG. 3, for example, some of antennas 40 may be placed in upper end region 42 of housing 12 and some of antennas 40 may be placed in lower end region 44 of housing 12. The antenna structures in device 10 may include a single antenna in region 42, a single antenna in region 44, multiple antennas in region 42, multiple antennas in region 44, or may include one or more antennas located elsewhere in housing 12.

Antenna structures 40 may be formed within some or all of regions such as regions 42 and 44. For example, an antenna such as antenna 40T-1 may be located within region 42-1 or an antenna such as antenna 40T-2 may be formed that fills some or all of region 42-1. An antenna such as antenna 40B-1 may fill some or all of region 44-2 or an antenna such as antenna 40B-2 may be formed in region 44-1. These types of arrangements need not be mutually exclusive. For example, region 44 may contain a first antenna such as antenna 40B-1 and a second antenna such as antenna 40B-2.

Transceiver circuitry 90 may contain transmitters such as transmitters 48 and receivers such as receivers 50. Transmitters 48 and receivers 50 may be implemented using one or more integrated circuits (e.g., cellular telephone communications circuits, wireless local area network communications circuits, circuits for Bluetooth® communications, circuits for receiving satellite navigation system signals). Transceiver circuitry 90 may be formed with associated power amplifier circuits for increasing transmitted signal power, low noise amplifier circuits for increasing signal power in received signals, other suitable wireless communications circuits, and combinations of these circuits.

Figure 4:
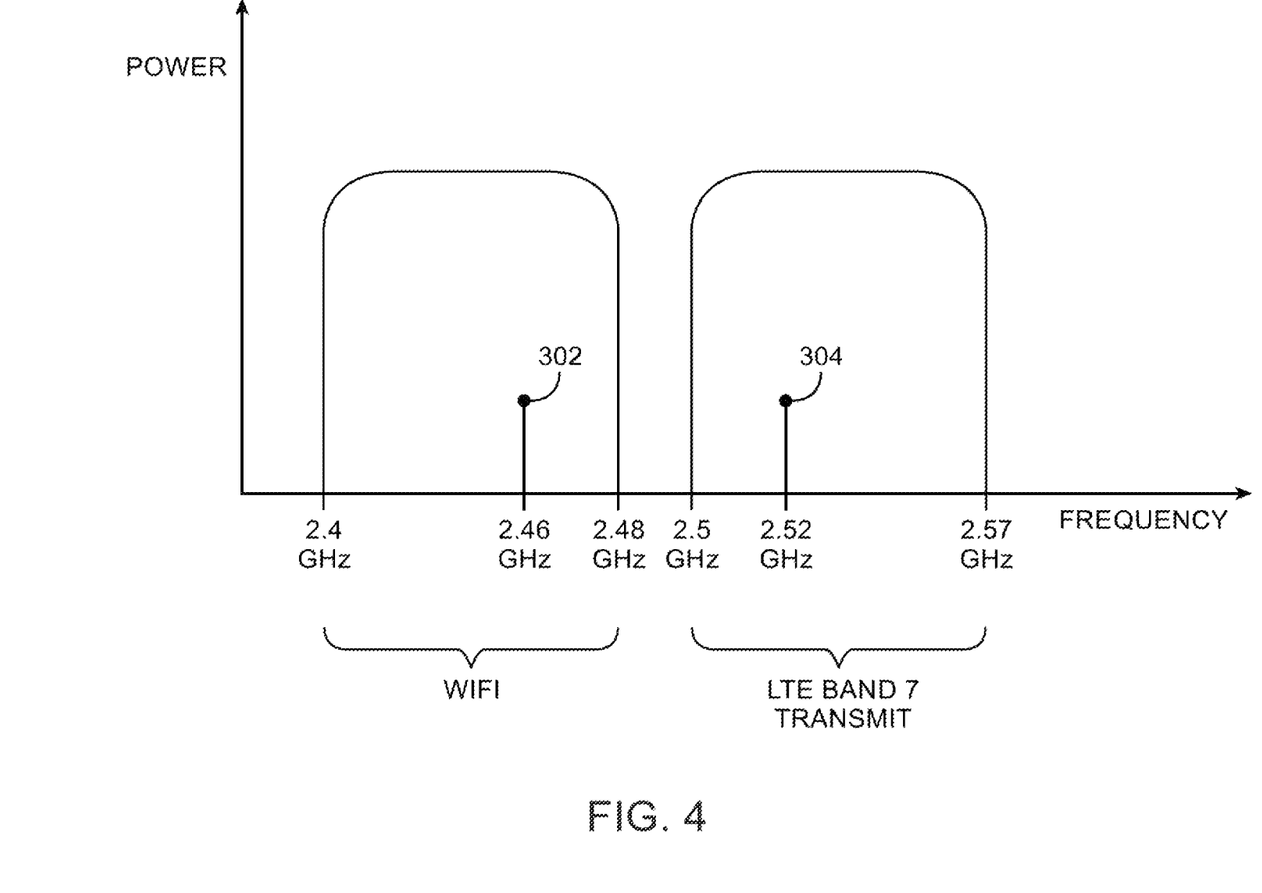
FIG. 4 is an illustrative diagram showing two adjacent frequency bands in accordance with an embodiment of the present invention.

Device 10 may communicate simultaneously using various wireless technologies (e.g., wireless standards and/or protocols). FIG. 4 shows an illustrative example in which device 10 transmits radio-frequency signals using Wi-Fi® and LTE. The Wi-Fi® signals may be transmitted in the Wi-Fi® 2.4 GHz frequency band (e.g., frequencies ranging from about 2.4 GHz to 2.48 GHz). The LTE signals may be transmitted in LTE band 7 (e.g., frequencies between about 2.5 GHz to 2.57 GHz). The frequency bands may be adjacent to each other.

Wireless communications circuitry such as circuitry 34 in device 10 may include non-linear components such as transistors. Non-linear components through which radio-frequency signals (e.g., Wi-Fi® signals and LTE signals) pass through can potentially produce non-linear components that interfere with wireless communications. For example, non-linear operation of wireless communications circuitry may result in intermodulation between the Wi-Fi® signals and the LTE signals. The intermodulation may produce intermodulation products (e.g., undesired radio-frequency signals) at frequencies within the Wi-Fi® and LTE frequency bands. For example, third order intermodulation between signals at first and second frequencies may produce signals (e.g., intermodulation products) at frequencies of two times the first frequency minus the second frequency and at two times the second frequency minus the first frequency.

Consider the scenario in which signals transmitted at 2.48 GHz (e.g., Wi-Fi® signals) are simultaneously transmitted with signals at 2.5 GHz (e.g., LTE band 7 signals). In this scenario, third order intermodulation products 302 and 304 may be produced at 2.46 GHz and 2.52 GHz that lie within the Wi-Fi® 2.4 GHz band and LTE band 7. Intermodulation products 302 and 304 may interfere with Wi-Fi® and LTE communications at 2.46 GHz and 2.52 GHz. This example is merely illustrative. Simultaneously transmitted signals at any two frequencies may potentially produce undesired signals associated with non-linear operation of components in device 10.

To reduce the amount of interference between wireless communications in different frequency bands (e.g., between Wi-Fi® communications at 2.4 GHz and communications in LTE band 7), adjacent frequency bands may be simultaneously transmitted using antennas that are located at opposite ends of device 10. For example, LTE communications may be assigned to an upper antenna such as antenna 40T-1 located in region 42 (e.g., an upper portion of device 10) whereas Wi-Fi® communications may be assigned to a lower antenna such as antenna 40B-1 of region 44 (e.g., a lower portion of device 10). By transmitting LTE signals using upper antenna 40T-1 and Wi-Fi® signals using lower antenna 40B-1, interference between the LTE and Wi-Fi® signals may be reduced (e.g., because each antenna may receive radio-frequency signals from the other antenna at a reduced power, thereby reducing intermodulation effects). Adjacent frequency bands may be any two frequency bands that are sufficiently close in frequency that simultaneous transmissions in the two frequency bands can interfere with each other (e.g., due to non-linear operation of device 10).

Figure 5:
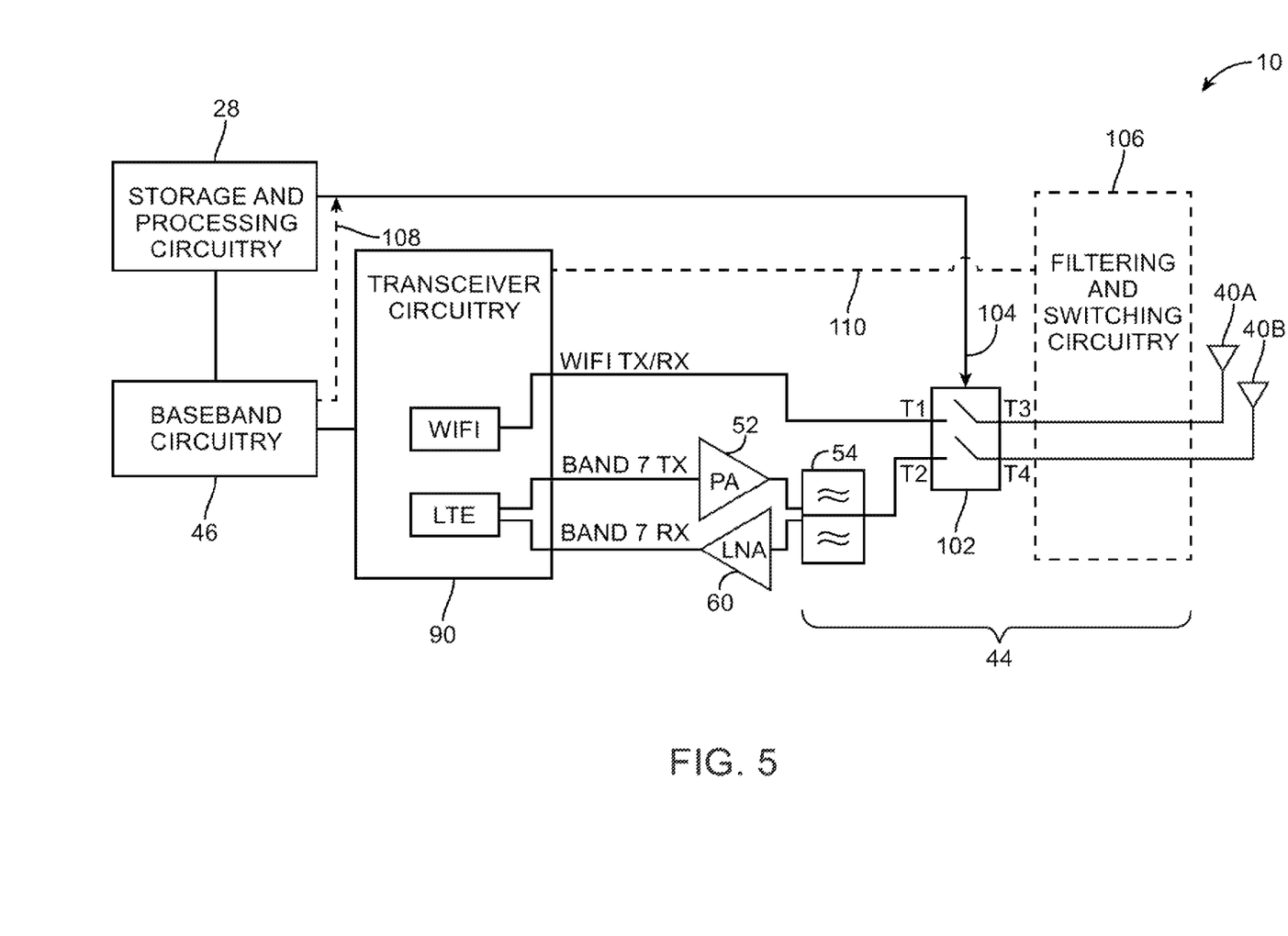
FIG. 5 is an illustrative diagram of wireless communications circuitry with antenna switching circuitry in accordance with an embodiment of the present invention.

Antenna diversity such as antenna transmit diversity may be performed to dynamically select which antenna is used for wireless communications. For example, antenna transmit diversity may be performed to optimize cellular communications (e.g., LTE communications) between device 10 and a base station such as base station 6. In this scenario, cellular radio-frequency signals may be transmitted using a selected one of the upper or lower antennas based on the quality of a communications link between device 10 and the base station. FIG. 5 shows an illustrative example in which device 10 is provided with antenna switching circuitry 102 that accommodates antenna transmit diversity while ensuring that wireless communications in adjacent frequency channels are routed to different antennas.

As shown in FIG. 5, antenna switching circuitry 102 may have ports T1, T2, T3, and T4. Port T3 may be coupled to a first antenna 40A and port T4 may be coupled to a second antenna 40B. Antenna 40A may be an upper antenna such as antennas 40T-1 and 40T-2 whereas antenna 40B may be a lower antenna such as antennas 40B-1 and 40B-2. Ports T1 and T2 may correspond to respective frequency bands that are adjacent to each other (e.g., sufficiently close in frequency to produce interfering intermodulation products during simultaneous radio-frequency transmissions). In the example of FIG. 5, port T1 corresponds to communications in the Wi-Fi® 2.4 GHz frequency band whereas port T2 corresponds to communications in LTE band 7 (e.g., a frequency band that is adjacent to the Wi-Fi® 2.4 GHz frequency band). This example is merely illustrative. If desired, switching circuitry 102 may be formed with any desired number of terminals. For example, switching circuitry 102 may be coupled to two or more antennas and may have ports associated with two or more adjacent frequency bands.

Switching circuitry 102 may be formed as part of radio-frequency front end 44. Radio-frequency front-end may include filtering circuitry such as duplexer 54. Duplexer 54 may be coupled to port T2 of switching circuitry 102 and may partition signals at port T2 of switching circuitry 102 into portions associated with LTE band 7 uplink and downlink frequencies. For example, duplexer 54 may include a high pass filter that passes LTE band 7 downlink (RX) frequencies (e.g., between 2.62 GHz and 2.69 GHz) and a low pass filter that passes LTE band 7 uplink (TX) frequencies (e.g., between 2.50 GHz and 2.57 GHz).

During signal transmission operations (e.g., operations associated with uplink frequencies), storage and processing circuitry 28 may provide data (e.g., one or more data streams) to baseband circuitry 46 for transmission. Baseband circuitry 46 may receive the transmission data and convert the data into corresponding baseband signals that are provided to transceiver circuitry 90. Transceiver circuitry 90 may convert the baseband signals into radio-frequency signals and provide the radio-frequency signals to switching circuitry 102. Switching circuitry 102 may select which antenna (e.g., antenna 40A or 40B) is to be used for transmitting the radio-frequency signals. The radio-frequency signals may be amplified by power amplifiers (PAs) such as power amplifier 52 before transmission via antennas 40A and 40B.

During signal reception operations (e.g., operations associated with downlink frequencies), antennas 40A and 40B may receive radio-frequency signals and provide the signals to switching circuitry 102 via ports T3 and T4. Switching circuitry 102 may be configured to route the received signals to transceiver circuitry 90 via an appropriate port. For example, switching circuitry 102 may be configured to route Wi-Fi® signals from antenna 40A to transceiver circuitry 90 via port T1 and cellular signals from antenna 40B to transceiver circuitry 90 via port T2 (or vice versa). The received signals may be amplified via low noise amplifiers (LNAs) such as low noise amplifier 60 to provide transceiver circuitry 90 with radio-frequency signals of sufficient strength for processing. Transceiver circuitry 90 may receive the radio-frequency signals from switching circuitry 102 and provide corresponding baseband signals to baseband circuitry 46. Baseband circuitry 46 may process the baseband signals to retrieve data from the baseband signals and provide the data to storage and processing circuitry 28.

Switching circuitry 102 may be controlled via path 104 to route signals in adjacent frequency bands to appropriate antennas. For example, switching circuitry 102 may be configured via path 104 to route Wi-Fi® signals between transceiver circuitry 90 and antenna 40A (e.g., by coupling port T1 to port T3) and to route LTE band 7 signals between transceiver circuitry 90 and antenna 40B (e.g., by coupling port T2 to port T4). As another example, switching circuitry 102 may be configured to route Wi-Fi® signals between transceiver circuitry 90 and antenna 40B and to route LTE band 7 signals between transceiver circuitry 90 and antenna 40A (e.g., by coupling port T1 to port T4 and port T2 to port T3).

If desired, front-end circuitry 44 may be formed with optional filter and switching circuitry 106. Optional filter and switching circuitry 106 may be interposed between switching circuitry 102 and antennas 40A and 40B. Filter and switching circuitry 106 may include components such as diplexers, duplexers, triplexers, solid-state switches, microelectromechanical systems (MEMS) switches or other filter and switching circuits. If desired, circuitry 106 may include passive components and matching circuitry. Filter and switching circuitry 106 may accommodate wireless communications in additional frequency bands. For example, filter and switching circuitry 106 may be coupled to transceiver circuitry 90 via optional path 110 and may accommodate wireless communications in frequency bands that are not adjacent to the Wi-Fi® 2.4 GHz band and/or LTE band 7 (e.g., other long range and short range frequency bands).

Figure 6:
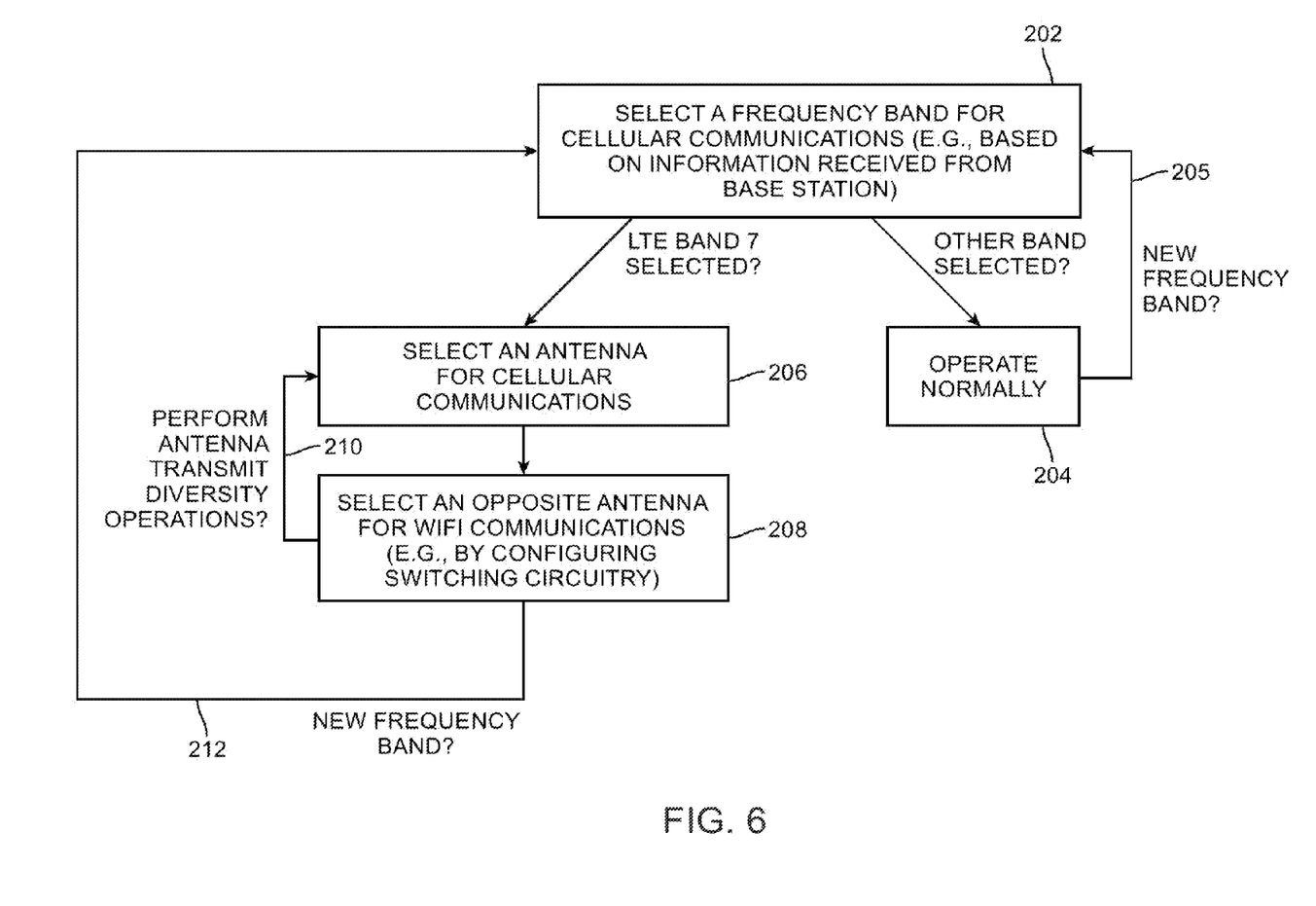
FIG. 6 is a flow chart of illustrative steps that may be performed to control antenna switching circuitry so that wireless communications in adjacent frequency bands are routed to different antennas in accordance with an embodiment of the present invention.

Switching circuitry 102 may be controlled by storage and processing circuitry 28 via path 104 to perform antenna transmit diversity for cellular wireless communications while ensuring that wireless communications in adjacent frequency bands are routed to different antennas (e.g., antennas located at opposite ends of device 10). Optionally, switching circuitry 102 may be controlled by baseband circuitry 46 via path 108 (e.g., instead of or in combination with storage and processing circuitry 28). FIG. 6 shows a flowchart of illustrative steps that may be performed (e.g., by storage and processing circuitry 28 and/or baseband circuitry 46) to control switching circuitry 106 to ensure that wireless communications in adjacent frequency bands are routed to different antennas.

In step 202, processing circuitry 28 may select a frequency band for cellular communications. The frequency band may be selected based on control information received from a base station such as base station 6. For example, the control information may direct device 10 to communicate with the base station using a given frequency band. If LTE band 7 is selected (or any other frequency band that is adjacent to the Wi-Fi® 2.4 GHz frequency band), the operations of step 206 may be performed. If a frequency band that is not adjacent to the Wi-Fi® 2.4 GHz frequency band is selected, the operations of step 204 may be performed.

The example of FIG. 6 in which selection of frequency bands that are adjacent to the Wi-Fi 2.4 GHz frequency band are used to trigger processing of step 206 is merely illustrative. In general, selection of any frequency band that may potentially cause interference with other wireless communications (e.g., selection of a frequency band for a first transceiver that is adjacent to a frequency band used by a second transceiver) used by may be used to trigger processing of steps 206 and 208. For example, wireless communications circuitry 34 may be used for Bluetooth operations in the 2.4 GHz frequency band. In this scenario, cellular operations in adjacent frequency bands such as LTE band 7 can potentially interfere with Bluetooth communications in the 2.4 GHz frequency band and Bluetooth communications may be assigned to an opposite antenna to cellular communications (e.g., during step 208, switching circuitry may be configured to select an opposite antenna for Bluetooth communications).

In step 204, device 10 may operate normally. For example, device 10 may perform antenna transmit diversity operations to select an optimal antenna for cellular transmissions without modifying Wi-Fi® signal paths during step 204 (e.g., because interference between the selected cellular frequency band and the Wi-Fi® frequency band may be minimal). If processing circuitry 28 determines that a new frequency band should be used for cellular communications (e.g., if a base station instructs device 10 to communicate on a new frequency band), the process may return to step 202 via path 205.

In step 206, processing circuitry 28 may select an antenna for cellular communications (e.g., for communications in LTE band 7). For example, processing circuitry 28 may perform antenna transmit diversity operations to select an antenna for cellular communications based on received signal strengths or other indicators of communications link quality between device 10 and a base station. Switching circuitry 102 may be directed by processing circuitry 28 to route cellular communications between transceiver circuitry 90 and the selected antenna.

In step 208, processing circuitry 28 may select an antenna for Wi-Fi® communications based on the antenna selected for cellular communications in step 206. For example, if an upper antenna such as antenna 40T-1 was selected for cellular communications, processing circuitry 28 may select a lower antenna such as antenna 40B-1 for Wi-Fi® communications. In other words, an antenna located at an opposite end of device 10 (relative to the antenna selected for cellular communications) may be selected for Wi-Fi® communications. Processing circuitry 28 may provide control signals to switching circuitry 102 via path 104 to direct switching circuitry 102 to route Wi-Fi® communications between transceiver circuitry 90 and the antenna selected for Wi-Fi® communications.

Additional antenna transmit diversity operations may be performed by returning to step 206 via path 210 to re-select the antenna used for cellular communications. If processing circuitry 28 determines that a new frequency band should be used for cellular communications (e.g., if a base station instructs device 10 to communicate on a new frequency band), the process may return to step 202 via path 212.

The example in which Wi-Fi® communications are routed to a different antenna from the antenna used for LTE band 7 communications is merely illustrative. If desired, self-interference associated with intermodulation between any two (or more) adjacent frequency bands may be reduced by assigning different antennas to each of the adjacent frequency bands. The antennas may be assigned by configuring switching circuitry to route radio-frequency signals of each frequency band to a selected antenna.

Figure 7:
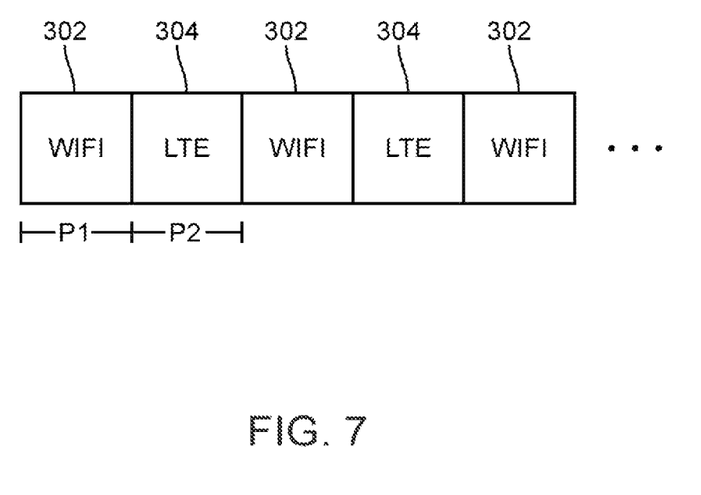
FIG. 7 is an illustrative diagram showing how Wi-Fi® and LTE communications may be partitioned in time to avoid self-interference in accordance with an embodiment of the present invention.

In another suitable embodiment, radio-frequency self-interference associated with simultaneous communications in adjacent frequency bands may be avoided by partitioning wireless communications in time (sometimes referred to as time division multiplexing). FIG. 7 is an illustrative timing diagram showing how Wi-Fi® and LTE communications may be partitioned in time to avoid self-interference. As shown in FIG. 7, Wi-Fi® communications may be assigned to time slots 302, whereas LTE communications may be assigned to time slots 304. Time slots 302 and 304 may have associated lengths P1 and P2. Times P1 and P2 may be selected dynamically (e.g., based on bandwidth requirements of the Wi-Fi® and LTE communications) or may be statically configured. For example, the duration of time P1 may be increased (relative to the duration of time P2) to provide increased bandwidth for Wi-Fi communications or the duration of time P1 may be decreased to provide increased bandwidth for cellular communications.

During time slots 302, antenna switching circuitry such as antenna switching circuitry 102 of FIG. 5 may be configured to route Wi-Fi® communications between transceiver circuitry 90 and a selected antenna (e.g., an antenna selected during antenna transmit diversity operations). During time slots 304, antenna switching circuitry 102 may be configured to route LTE communications between transceiver circuitry 90 and the selected antenna.

As an example, consider the scenario in which antenna 40A of FIG. 5 is selected for wireless communications. In this scenario, antenna switching circuitry 102 may be configured to couple port T1 to port T3 during time periods 302 and configured to couple port T2 to port T3 during time periods 304. By separating Wi-Fi® and LTE communications in time, self-interference associated with non-linear operation of device 10 may be reduced (e.g., because radio-frequency signals in adjacent frequency bands may not be simultaneously transmitted at any given point in time).

Time division multiplexing to reduce self-interference may be performed instead of or in combination with the antenna switching of FIG. 6. For example, time division multiplexing such as shown in FIG. 7 may be performed during step 208 of FIG. 6 to reduce self-interference associated with radio-frequency signals that are transmitted in adjacent frequency bands such as LTE band 7 and the Wi-Fi®2.4 GHz frequency band.

The example of FIG. 7 in which time division multiplexing is performed on LTE and Wi-Fi communications is merely illustrative. If desired, time division multiplexing may be performed on simultaneous communications in adjacent frequency bands. For example, time division multiplexing may be performed on LTE and Bluetooth communications to reduce self-interference.

The foregoing is merely illustrative of the principles of this invention and various modifications can be made by those skilled in the art without departing from the scope and spirit of the invention.

What is claimed is:

1. A method of operating a wireless electronic device having three antennas, the method comprising:
    with control circuitry, selecting a first antenna of the three antennas to use for radio-frequency transmissions in a first frequency band that is susceptible to intermodulation interference with a second frequency band; and
    with switching circuitry, mitigating intermodulation interference between the first and second frequency bands by performing time division multiplexing between radio-frequency transmissions in the first frequency band and radio-frequency transmissions in the second frequency band, wherein performing the time division multiplexing comprises:

periodically routing radio-frequency signals in the first frequency band to the selected first antenna for a first duration;

periodically routing radio-frequency signals in the second frequency band to the selected first antenna for a second duration subsequent to the first duration; and while routing the respective radio-frequency signals in the first and second frequency bands to the selected first antenna, dynamically adjusting a ratio of the first duration to the second duration to provide increased bandwidth for communications in a given one of the first and second frequency bands.

2. The method defined in claim 1 further comprising:
with a first transceiver, providing the radio-frequency signals in the first frequency band to the switching circuitry; and
with a second transceiver, providing the radio-frequency signals in the second frequency band to the switching circuitry.

3. The method defined in claim 1 wherein the first frequency band comprises a wireless local area network frequency band.

4. The method defined in claim 3 wherein the second frequency band comprises a cellular telephone frequency band.

5. The method defined in claim 1 wherein the first frequency band comprises a cellular telephone frequency band.

6. The method defined in claim 5 wherein the cellular telephone frequency band comprises a Long Term Evolution (LTE) frequency band.

7. The method defined in claim 6 wherein the LTE frequency band comprises LTE band 7.

8. An electronic device, comprising:
a conductive rectangular housing at an exterior surface of the electronic device that extends from a first face to an opposing second face of the electronic device, wherein the conductive rectangular housing has first and second opposing ends, a first portion at the first end, and a second portion at the second end;

first, second, and third antennas, wherein the first antenna is formed at least partially from the first portion and the second antenna is formed at least partially from the second portion;

first and second transceivers, wherein the first transceiver is operable to produce radio-frequency signals in a first frequency band of a plurality of frequency bands and the second transceiver is operable to produce radio-frequency signals in a second frequency band of the plurality of frequency bands;

switching circuitry operable in a first configuration in which the first transceiver is coupled to the first antenna and further operable in a second configuration in which the second transceiver is coupled to the first antenna; and control circuitry that mitigates intermodulation interference between the first and second frequency bands by controlling the switching circuitry to operate in the first configuration during a first time period, by controlling the switching circuitry to operate in the second configuration during a second time period subsequent to the first time period, by controlling the switching circuitry to operate in the first configuration during a third time period subsequent to the second time period, and by controlling the switching circuitry to operate in the second configuration during a fourth time period subsequent to the third time period, wherein the duration of the third time period is different from the duration of the first time period and the duration of the fourth time period is different from the duration of the second time period.

9. The electronic device defined in claim 8 wherein the first antenna is located at a first end of the electronic device and wherein the second antenna is located at a second end of the electronic device.

10. The electronic device defined in claim 8 wherein the first transceiver comprises a cellular transceiver.

11. The electronic device defined in claim 10 wherein the second transceiver comprises a Wi-Fi transceiver.

12. The electronic device defined in claim 10 wherein the cellular transceiver comprises a Long-Term Evolution transceiver.

13. The electronic device defined in claim 8 wherein the first frequency band comprises a wireless local area network frequency band.

14. The electronic device defined in claim 13 wherein the second frequency band comprises a cellular telephone frequency band.

15. The electronic device defined in claim 8 wherein the first frequency band comprises a cellular telephone frequency band.

16. A method of operating wireless communications circuitry in an electronic device, wherein the wireless communications circuitry includes a first transceiver that communicates using a plurality of frequency bands and a second transceiver that communicates using a Wi-Fi frequency band, the method comprising:
selecting a frequency band between 2.5 and 2.57 gigahertz (GHz) from the plurality of frequency bands for communications using the first transceiver;
selecting an antenna from one of first and second antennas for communications in the selected frequency band;
determining whether the communications in the selected frequency band using the first transceiver interferes with communications in the Wi-Fi frequency band; and
in response to determining that the communications in the selected frequency band interferes with the communications in the Wi-Fi frequency band, performing time division multiplexing using the switching circuitry between communications in the selected frequency band and communications in the Wi-Fi frequency band over the selected antenna, wherein performing the time division multiplexing comprises:
periodically routing radio-frequency signals in the selected frequency band to the selected antenna for a first duration;
periodically routing radio-frequency signals in the Wi-Fi frequency band to the selected antenna for a second duration subsequent to the first duration; and
while routing the respective radio-frequency signals in the selected frequency band and the Wi-Fi frequency band to the selected antenna, dynamically adjusting a ratio of the first duration to the second duration to provide increased bandwidth for communications in a given one of the Wi-Fi and selected frequency bands.

17. The method defined in claim 16 wherein the first transceiver comprises a cellular transceiver and wherein the second transceiver comprises a Wi-Fi transceiver, the method further comprising:
with the cellular transceiver, transmitting radio-frequency signals in a LTE band 7 frequency band; and with the Wi-Fi transceiver, transmitting radio-frequency signals in the Wi-Fi frequency band.

18. The method defined in claim 17, wherein the first and second antennas are formed at opposing ends of the electronic device, the method further comprising:
with switching circuitry, routing the radio-frequency signals transmitted in the LTE band 7 frequency band to the first antenna; and
with the switching circuitry, mitigating interference in the LTE band 7 frequency band by routing the radio-frequency signals transmitted in the Wi-Fi frequency band to the second antenna.

19. A method of operating a wireless electronic device having a first transceiver that communicates using a plurality of cellular telephone frequency bands and a second transceiver that communicates using a given frequency band, the method comprising:
selecting a cellular telephone frequency band that is different from given frequency band from the plurality of frequency bands for communications using the first transceiver;
selecting an antenna from first and second antennas for communications in the selected cellular telephone frequency band;
determining whether the communications in the selected cellular telephone frequency band interferes with communications in the given frequency band; and
in response to determining that the communications in the selected cellular telephone frequency band interferes with the communications in the given frequency band, performing time division multiplexing using the switching circuitry between communications in the selected cellular telephone frequency band and communications in the given frequency band, wherein performing the time division multiplexing comprises:
with switching circuitry, routing communications in the selected cellular telephone frequency band between the first transceiver and the selected antenna during a first time period; and
with the switching circuitry, routing communications in the given frequency band between the second transceiver and the selected antenna during a second time period subsequent to the first time period;
with the switching circuitry, routing communications in the selected cellular telephone frequency band between the first transceiver and the selected antenna during a third time period subsequent to the second time period, wherein the duration of the third time period is different from the duration of the first time period; and
with the switching circuitry, routing communications in the given frequency band between the second transceiver and the selected antenna during a fourth time period subsequent to the third time period, wherein the duration of the fourth time period is different from the duration of the second time period.

20. The method defined in claim 19 wherein the first transceiver comprises a Long-Term Evolution cellular transceiver and wherein the second transceiver comprises a Wi-Fi transceiver, the method further comprising:
with the Long-Term Evolution cellular transceiver, transmitting radio-frequency signals in the selected cellular telephone frequency band over the selected antenna during the first time period; and
with the second transceiver, transmitting radio-frequency signals in the given frequency band over the selected antenna during the second time period.

21. The method defined in claim 19 wherein the plurality of frequency bands comprises a plurality of cellular frequency bands, wherein the given frequency band comprises a Wi-Fi frequency band, and wherein determining whether the communications in the selected cellular telephone frequency band interferes with the communications in the given frequency band comprises:
determining whether a LTE frequency band is adjacent to the Wi-Fi frequency band.

22. The method defined in claim 19 wherein the plurality of frequency bands comprises a plurality of cellular frequency bands, wherein the given frequency band comprises a Bluetooth frequency band, and wherein determining whether the communications in the selected cellular telephone frequency band interferes with the communications in the given frequency band comprises:
determining whether the selected cellular telephone frequency band is adjacent to the Bluetooth frequency band.

* * * * *